United States Patent [19]

Takahashi et al.

[11] Patent Number: 5,478,869
[45] Date of Patent: Dec. 26, 1995

[54] PROTECTIVE COATING MATERIAL

[75] Inventors: Yosuke Takahashi, Atsugi; Noriaki Oshima, Ebina; Yasuhiko Shida, Yamato; Reiko Otomo, Yokohama, all of Japan

[73] Assignee: Tosoh Corporation, Shinnanyo, Japan

[21] Appl. No.: 281,137

[22] Filed: Jul. 27, 1994

Related U.S. Application Data

[63] Continuation of Ser. No. 964,885, Oct. 22, 1992, abandoned.

[30] Foreign Application Priority Data

Oct. 24, 1991 [JP] Japan ..................... 3-303909

[51] Int. Cl.$^6$ ..................... C08K 3/34
[52] U.S. Cl. ............... 522/77; 522/79; 522/182; 522/183
[58] Field of Search ............... 522/77, 79, 182, 522/183

[56] References Cited

U.S. PATENT DOCUMENTS

| | | | |
|---|---|---|---|
| 4,237,185 | 12/1980 | Lombardi | 427/558 |
| 4,455,205 | 6/1984 | Olson | 522/44 |
| 4,902,724 | 2/1990 | Moore | 522/40 |
| 5,075,348 | 12/1991 | Revis et al. | |
| 5,213,875 | 5/1993 | Su | 522/79 |

FOREIGN PATENT DOCUMENTS

| | | |
|---|---|---|
| 0378144 | 7/1990 | European Pat. Off. |
| 0430583 | 6/1991 | European Pat. Off. |

OTHER PUBLICATIONS

Patent Abstracts of Japan, vol. 14, No. 134, (C–0701), Mar. 14, 1990, AN 88 157 485, JP–A–20 06 562, Y. Katsuhiro, et al., Jan. 10, 1990, "Protective Coating Agent for Optical Disc".

Patent Abstracts of Japan, vol. 15, No. 413, (C–0877), Oct. 22, 1991, AN 89–313 148, JP–A–31 72 358, U. Yutaka, et al., Jul. 25, 1991, "Resin Composition for Overcoating Optical Disc".

*Primary Examiner*—Mark A. Chapman
*Attorney, Agent, or Firm*—Oblon, Spivak, McClelland, Maier & Neustadt

[57] ABSTRACT

A protective coating material comprising (meth)acrylate derivatives of the following formulas ①, ②, ③, ④ and ⑤ within the following ranges of a, b, c, d and e % by weight, respectively:

$5 \leq a \leq 80$, $0 \leq b \leq 30$, $0 \leq c \leq 30$, $5 \leq d \leq 50$,
$0 \leq e \leq 50$, provided that $a+b+c+d+e=100$,

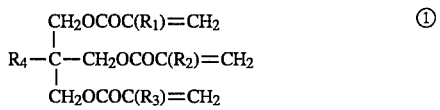

wherein each of $R_1$ to $R_3$ is H or $CH_3$, and $R_4$ is $CH_2CH_3$ or $CH_2OH$,

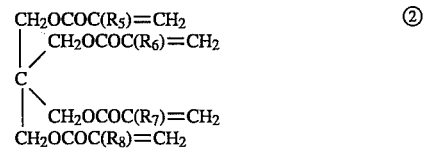

wherein each of $R_5$ to $R_8$ is H or $CH_3$,

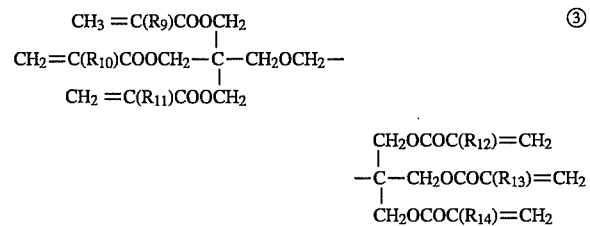

wherein each of $R_9$ to $R_{14}$ is H or $CH_3$, $$CH_2=C(R_{15})COO(CH_2)_nOCOC(R_{16})=CH_2 \qquad ④$$

wherein each of $R_{15}$ and $R_{16}$ is H or $CH_3$, and n is an integer of from 2 to 10.

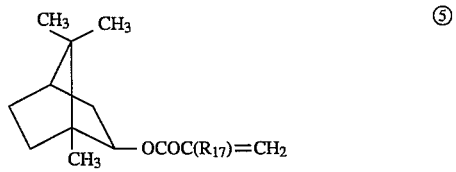

wherein R17 is H or $CH_3$.

13 Claims, No Drawings

PROTECTIVE COATING MATERIAL

This application is a Continuation of application Ser. No. 07/964,885, filed on Oct. 22, 1992, now abandoned.

The present invention relates to a protective coating material. More particularly, it relates to a protective coating material for a thin film of a metal composition constituting a recording layer or a reflecting layer in an optical medium such as an optical disk.

The recording layer of an optical medium such as an optical disk is formed by vapor deposition or sputtering of a metal composition such as terbium-iron-cobalt (Tb-Fe-Co) in the form of a thin film on a substrate for medium, and a reflecting layer made of e.g. aluminum will be formed thereon in a similar manner. Such a thin film layer of a metal composition, particularly the reflecting layer laminated last among these thin films, is poor in the durability against physical scratching or abrasion from outside or in the chemical durability such as durability against oxidative modification by itself. Therefore, it is common to form a protective coating layer made of an organic composition thereon.

The protective coating material to be used for forming such a protective coating layer, is required to have properties such that it bonds to an exposed portion of the substrate of medium made of e.g. polycarbonate, it exhibits sufficient adhesion to the above-mentioned thin metal film layer, and it provides sufficient hardness, scuff resistance and chemical durability to protect the thin metal film layer from physical scratching and abrasion. However, there has been no coating material which fully satisfies all of these requirements. Further, a coating material having the viscosity adjusted by an organic solvent to be suitable for spin coating, is commonly known. However, such a coating material has problems such that an installation and time are required to distill the solvent off, and the solvent is likely to adversely affect the environment. Therefore, a solventless coating material is desired.

In view of the above problems, it is an object of the present invention to provide a solventless protective coating material which provides physical and chemical protective properties for a recording layer of an optical medium and for a thin metal film layer constituting a reflecting layer and which is excellent in the coating property and has a practically sufficient adhesiveness.

As a result of extensive studies to solve the above problems, the present inventors have found that a base resin obtained by mixing at least tri-functional polyfunctional (meth)acrylates of the following formulas ①, ② and ③, a bifunctional (meth)acrylate of the following formula ④ and a (meth)acrylate of the following formula ⑤, is suitable as the desired protective coating material. The present invention has been accomplished on the basis of this discovery.

Thus, the present invention provides a protective coating material comprising (meth)acrylate derivatives of the following formulas ①, ②, ③, ④ and ⑤ within the following ranges of a, b, c, d and e % by weight, respectively:

$5 \leq a \leq 80$, $0 \leq b \leq 30$, $0 \leq c \leq 30$, $5 \leq d \leq 50$, $0 \leq e \leq 50$, provided that $a+b+c+d+e=100$,

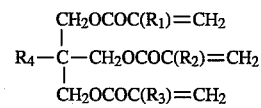  ① wherein each of $R_1$ to $R_3$ is H or $CH_3$, and $R_4$ is $CH_2CH_3$ or $CH_2OH$,

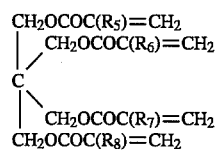  ② wherein each of $R_5$ to $R_8$ is H or $CH_3$,

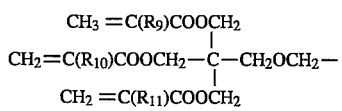  ③

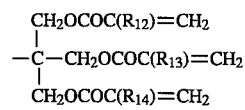

wherein each of $R_9$ to $R14$ is H or $CH_3$, $$CH_2=C(R_{15})COO(CH_2)_nOCOC(R_{16})=CH_2 \quad ④$$

wherein each of $R_{15}$ and $R_{16}$ is H or $CH_3$, and n is an integer of from 2 to 10.

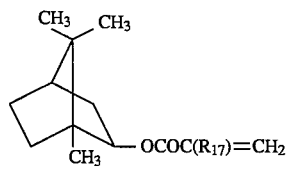  ⑤ wherein $R_{17}$ is H or $CH_3$.

Now, the present invention will be described in detail with reference to the preferred embodiments.

Here, the compound of the formula ① is a tri-functional (meth)acrylate. Specifically, pentaerythritol triacrylate, pentaerythritol trimethacrylate, trimethylolpropane triacrylate or trimethylolpropane trimethacrylate may, for example, be mentioned.

The compound of the formula ① is added in an amount within a range of from 5 to 80% by weight, preferably from 20 to 70% by weight, based on the base resin. This compound is added to impart the protective coating material sufficient hardness and scuff resistance required to protect the thin metal film layer from physical scratching and abrasion and to give a sufficient adhesive property to the thin metal film layer. If the amount is less than 5% by weight, the desired hardness and scuff resistance tend to hardly be obtainable. On the other hand, if it exceeds 80% by weight, the shrinkage upon curing of the protective coating material tends to be high, such being undesirable.

The compound of the formula ② may, for example, be pentaerythritol tetraacrylate or pentaerythritol tetramethacrylate. The compound of the formula ③ may, for example, be dipentaerythritol hexaacrylate or dipentaerythritol hexamethacrylate. Each of these compounds is added in an amount within a range of from 0 to 30% by weight, preferably from 0 to 25% by weight. These compounds are added as crosslinking agents. However, if they are added in an amount exceeding 30% by weight, the crosslinking degree tends to be too high, whereby the adhesion of the cured protective coating layer to the thin metal film layer tends to be low, such being undesirable.

The compound of the formula ④ is a bifunctional (meth-)acrylate. Specifically, ethylene glycol diacrylate, ethylene glycol dimethacrylate, 1,3-propanediol diacrylate, 1,3-propanediol dimethacrylate, 1,4-butanediol diacrylate, 1,4-butanediol dimethacrylate, 1,5-pentanediol diacrylate, 1,5-pentanediol dimethacrylate, 1,6-hexanediol diacrylate, 1,6-hexanediol dimethacrylate, 1,7-heptanediol diacrylate, 1,7-heptanediol dimethacrylate, 1,8-octanediol diacrylate, 1,8-octanediol dimethacrylate, 1,9-nonanediol diacrylate, 1,9-nonanediol dimethacrylate, 1,10-decanediol diacrylate or 1,10-decanediol dimethacrylate may, for example, be mentioned. The compound of the formula ④ is used in an amount of from 5 to 50% by weight to adjust the viscosity of the coating material and to obtain adequate adhesion to a polycarbonate substrate. At a concentration of lower than 5% by weight, no substantial effect for the adhesion can be obtained. On the other hand, if it is added in an amount exceeding 50% by weight, the desired protective properties can not be obtained.

The compound of the formula ⑤ may be isobornyl acrylate or isobornyl methacrylate. This compound is used to introduce a hydrophobic structure to reduce the moisture permeability and to adjust the viscosity of the coating material. This compound is used in an amount within a range of from 0 to 50% by weight, preferably from 5 to 45% by weight. This compound is monofunctional, and if it is added in an amount exceeding 50% by weight, the formed film tends to hardly take a three dimensional structure, such being undesirable.

The above-described compounds are mixed to prepare a base resin for the protective coating material. Here, acrylates and methacrylates may be used in combination. However, it is preferred to use acrylates, since they have higher reactivity.

By polymerizing such a base resin, a protective coating material can be obtained. The polymerization may be conducted by a conventional method using heat, ultraviolet rays, X-rays or electron beams. However, polymerization is preferably conducted by ultraviolet rays from the viewpoint of handling efficiency, etc. As a source for ultraviolet rays, a high pressure mercury lamp or the like is preferred.

To cure the material with ultraviolet rays, at least one photopolymerization initiator is incorporated. As such initiator, 1-hydroxycyclohexylphenylketone, benzophenone, 2,2-dimethoxy-2-phenylacetophenone, 2-benzyl-2-dimethylamino-1-(4-morpholinophenyl)-butane-1-one, 2,2-dimethoxy-1,2-diphenylethan-1-one or diethoxyacetophenone may, for example, be mentioned. These initiators may be used alone or in combination as a mixture of two or more of them. The initiator is used in an amount of from 0.1 to 10% by weight relative to the base resin. If it is added in an amount exceeding 10% by weight, it is likely that the three dimensional crosslinking density of the formed coating layer tends to be low, or bleeding out takes place as time passes, thus leading to surface staining. On the other hand, if the amount is less than 0.1% by weight, there will be substantially no initiating effects, such being not practical.

Further, for the purpose of imparting a uniform coating property (to improve the wettability of the thin metal film surface having fine irregularities) and preventing formation of coating film defects such as orange peel or craters, a leveling agent may be incorporated. As such a leveling agent, a silicone-type surfactant or a fluorine-type surfactant is generally known. They may be used alone or in combination as a mixture of two or more of them. Further, a hydrocarbon surfactant may be added thereto. The surface tension of the surfactant to be incorporated is preferably not higher than 35 dyne/cm, more preferably not higher than 25 dyne/cm, as a 1% aqueous solution at 25° C. The amount varies depending upon the type of the surfactant, but is usually from 0.005 to 3% by weight relative to the base resin.

The silicone surfactant may, for example, be "KP323" and "KP324", tradenames, manufactured by Shinetsu Chemical Industries Company Ltd., "Polyether-modified silicone oil KF-351", "KF-352" and "KF-615", tradenames, manufactured by Shinetsu Chemical Industries Company Ltd., "L-77" and "L-7602", tradenames, manufactured by Nippon Unicar K.K..

The fluorine-type surfactant may, for example, be "Surf-Ion S-381" and "S-382", tradenames, manufactured by Asahi Glass Company Ltd., and "Megafac F-142D" and "F-177", tradenames, manufactured by Dainippon Ink & Chemical Industries Company Ltd.

Further, to the protective coating material of the present invention, a heat stabilizer, an antioxidant and other additives may be incorporated to such an extent that they may not impair the desired properties of the protective coating material.

As is apparent from the foregoing description, the protective coating material of the present invention is of a solventless type and has an adequate bonding property to the substrate of medium and an adequate adhesive property to a thin metal film layer, and the protective coating layer formed by this protective coating material is excellent in the scuff resistance and chemical protecting performance for a thin metal film layer.

Now, the present invention will be described in further detail with reference to Examples. However, it should be understood that the present invention is by no means restricted to such specific Examples.

EXAMPLE 1

800 g of pentaerythritol triacrylate and 200 g of 1,6-hexanediol diacrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone as an ultraviolet ray polymerization initiator were added to obtain a protective coating material.

Then, 1.5 g of this coating material was dispensed on a reflecting layer of a 3.5 inch magneto-optical disk prepared by forming a magneto-optical recording layer on a polycarbonate substrate and laminating a reflecting layer made of aluminum thereon, followed by spin coating. Then, ultraviolet rays were irradiated onto the disk for 20 seconds from a height of 150 mm by means of a high pressure mercury lamp of 160 mW/cm to cure a protective coating layer having a thickness of 10 μm.

This magneto-optical disk was subjected to a durability test for 2,000 hours in an environment of relative humidity of 85% at a temperature of 80° C. and a test prescribed in JIS C5024 (Z/AD 20 cycles), and the results are shown in Table 1.

EXAMPLE 2

700 g of pentaerythritol triacrylate, 200 g of isobornyl acrylate and 100 g of 1,6-hexanediol diacrylate were mixed to obtain a base resin. To 1,000 g of this base resin, 1 g of a silicone-type additive (KP323, manufactured by Shinetsu Chemical Industries Company Ltd.) as a leveling agent and 30 g of 1-hydroxycyclohexyl phenyl ketone as an ultraviolet ray polymerization initiator to obtain a protective coating material. In the same manner as in Example 1, a protective coating layer was prepared, and the durability test was conducted. The results are shown in Table 1.

EXAMPLE 3

600 g of pentaerythritol triacrylate, 300 g of isobornyl acrylate and 100 g of 1,6-hexanediol diacrylate were mixed to obtain a base resin. To 1,000 g of this base resin, 1 g of a silicone-type additive (KP323, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 4

500 g of pentaerythritol triacrylate, 200 g of pentaerythritol tetraacrylate and 300 g of 1,6-hexanediol diacrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 5

500 g of trimethylolpropane triacrylate, 200 g of dipentaerythritol hexaacrylate and 300 g of 1,6-hexanediol diacrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 6

500 g of trimethylolpropane triacrylate, 100 g of pentaerythritol tetraacrylate, 100 g of dipentaerythritol hexaacrylate and 300 g of 1,6-hexanediol diacrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 7

500 g of pentaerythritol triacrylate, 100 g of pentaerythritol tetraacrylate, 100 g of dipentaerythritol hexaacrylate and 300 g of isobornyl acrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 8

500 g of pentaerythritol triacrylate, 200 g of dipentaerythritol hexaacrylate, 150 g of 1,6-hexanediol diacrylate and 150 g of isobornyl acrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 9

400 g of pentaerythritol triacrylate, 100 g of pentaerythritol tetraacrylate, 100 g of dipentaerythritol hexaacrylate, 200 g of 1,6-hexanediol diacrylate and 200 g of isobornyl acrylate were mixed to obtain a base resin. To 1,000 g of this base resin, 1 g of a silicone-type additive (KP324, manufactured by Shinetsu Chemical Industries Company Ltd.) as a leveling agent and 30 g of 1-hydroxycyclohexyl phenyl ketone and 30 g of benzophenone as ultraviolet ray polymerization initiators were added to obtain a protective coating material. In the same manner as in Example 1, a protective coating layer was prepared, and the durability test was conducted. The results are shown in Table 1.

EXAMPLE 10

700 g of pentaerythritol acrylate, 200 g of isobornyl acrylate and 100 g of 1,6-hexanediol diacrylate were mixed to obtain a base resin. To 1,000 g of this base resin, 1 g of a silicone-type additive (L-77, manufactured by Nippon Unicar K.K.) as a leveling agent and 30 g of 1-hydroxycyclohexyl phenyl ketone as an ultraviolet ray polymerization initiator was added to obtain a protective coating material. In the same manner as in Example 1, a protective coating layer was prepared, and the durability test was conducted. The results are shown in Table 1.

EXAMPLE 11

700 g of pentaerythritol triacrylate, 200 g of isobornyl acrylate and 100 g of 1,6-hexanediol diacrylate were mixed to obtain a base resin. To 1,000 g of this base resin, 1 g of a fluorine-type additive (S-381, manufactured by Asahi Glass Company Ltd.) as a leveling agent and 30 g of 1-hydroxycyclohexyl phenyl ketone as an ultraviolet ray polymerization initiator was added to obtain a protective coating material. In the same manner as in Example 1, a protective coating layer was prepared, and the durability test was conducted. The results are shown in Table 1.

TABLE 1

|  | Durability test[1] | Z/AD 20 cycles[2] |
| --- | --- | --- |
| Example 1 | Pass (No defect) | Pass (No defect) |
| Example 2 | Pass (No defect) | Pass (No defect) |

TABLE 1-continued

|  | Durability test[1] | Z/AD 20 cycles[2] |
|---|---|---|
| Example 3 | Pass (No defect) | Pass (No defect) |
| Example 4 | Pass (No defect) | Pass (No defect) |
| Example 5 | Pass (No defect) | Pass (No defect) |
| Example 6 | Pass (No defect) | Pass (No defect) |
| Example 7 | Pass (No defect) | Pass (No defect) |
| Example 8 | Pass (No defect) | Pass (No defect) |
| Example 9 | Pass (No defect) | Pass (No defect) |
| Example 10 | Pass (No defect) | Pass (No defect) |
| Example 11 | Pass (No defect) | Pass (No defect) |

[1]The magneto-optical disk is left to stand for 2,000 hrs at 80° C. under a relative humidity of 85%.
[2]JIS C 5024

As described in the foregoing, the protective coating material of the present invention is of a solventless type and has an adequate bonding property to a substrate and an adequate adhesive property to a thin metal film layer, and the protective coating layer formed by this protective coating material is excellent in the scuff resistance and chemical protecting performance for the thin metal film layer.

We claim:

1. A protective coating material free of non-reactive solvents which, prior to application to a substrate to be coated, consists essentially of (A) (meth)acrylate derivatives of the following formulas ①, ②, ③, ④ and ⑤ within the following ranges of a, b, c, d and e % by weight, respectively:
$5 \leq a \leq 80$, $0 \leq b \leq 30$, $0 \leq c \leq 30$, $5 \leq d \leq 50$, $0 \leq e \leq 50$, provided that $a+b+c+d+e=100$,

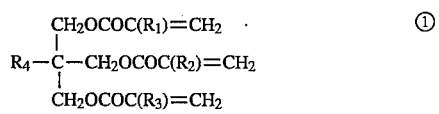

wherein each of $R_1$ to $R_3$ is H or $CH_3$, and $R_4$ is $CH_2CH_3$ or $CH_2OH$,

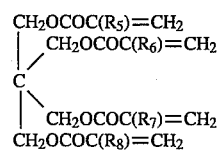

wherein each of $R_5$ to $R_8$ is H or $CH_3$,

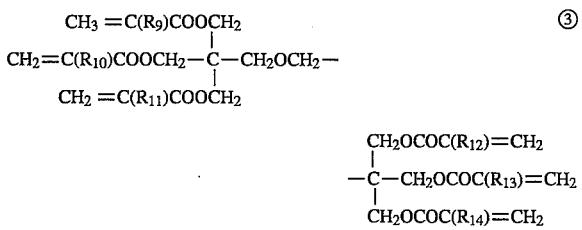

wherein each of $R_9$ to $R_{14}$ is H or $CH_3$

where each of $R_{15}$ and $R_{16}$ is H or $CH_3$, and n is an integer of from 2 to 10

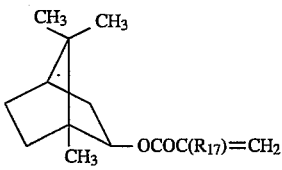

wherein $R_{17}$ is H or $CH_3$;

(B) a photoDolymerization initiator in an amount of from 0.1 to 10% by weight relative to total weight of said (meth) acrylate derivatives (A), and (C) a leveling agent in an amount of from 0.005 to 3% by weight relative to total weight of said (meth)acrylate derivative (A).

2. The protective coating material according to claim 1, wherein the compound of the formula ① is pentaerythritol triacrylate or pentaerythritol trimethacrylate.

3. The protective coating material according to claim 1, wherein the compound of the formula ② is pentaerythritol tetraacrylate or pentaerythritol tetramethacrylate.

4. The protective coating material according to claim 1, wherein the compound of the formula ③ is dipentaerythritol hexaacrylate or dipentaerythritol hexamethacrylate.

5. The protective coating material according to claim 1, wherein the compound of the formula ④ is ethylene glycol diacrylate, ethylene glycol dimethacrylate, 1,3-propanediol diacrylate, 1,3-propanediol dimethacrylate, 1,4-butanediol diacrylate, 1,4-butanediol dimethacrylate, 1,5-pentanediol diacrylate, 1,5-pentanediol dimethacrylate, 1,6-hexanediol diacrylate, 1,6-hexanediol dimethacrylate, 1,7-heptanediol diacrylate, 1,7-heptanediol dimethacrylate, 1,8-octanediol diacrylate, 1,8-octanediol dimethacrylate, 1,9-nonanediol diacrylate, 1,9-nonanediol dimethacrylate, 1,10-decanediol diacrylate or 1,10-decanediol dimethacrylate.

6. The protective coating material according to claim 1, which contains the compound of the formula ① in an amount of from 20 to 70% by weight relative to the total weight of said (meth)acrylate derivatives.

7. The protective coating material according to claim 1, which contains the compound of the formula ② in an amount of from 0 to 25% by weight relative to the total weight of said (meth)acrylate derivatives.

8. The protective coating material according to claim 1, which contains the compound of the formula ③ in an amount of from 0 to 25% by weight relative to the total weight of said (meth)acrylate derivatives.

9. The protective coating material according to claim 1, which contains the compound of the formula ⑤ in an amount of from 5 to 45% by weight relative to the total weight of said (meth)acrylate derivatives.

10. The protective coating material according to claim 1, wherein as the leveling agent, a surfactant having a surface tension of not higher than 35 dyne/cm is used.

11. The protective coating material according to claim 1, wherein as the leveling agent, a surfactant having a surface tension of not higher than 25 dyne/cm is used.

12. The protective coating material according to claim 1, wherein the leveling agent is a silicone-type surfactant.

13. The protective coating material according to claim 1, wherein the leveling agent is a fluorine-type surfactant.

* * * * *